United States Patent [19]

Hamlin

[11] Patent Number: 4,935,751

[45] Date of Patent: Jun. 19, 1990

[54] LEVEL SENSOR FOR INK BAG

[75] Inventor: Mindy Hamlin, Oceanside, Calif.

[73] Assignee: Hewlett-Packard Company, Palo Alto, Calif.

[21] Appl. No.: 410,771

[22] Filed: Sep. 21, 1989

[51] Int. Cl.[5] ...................... G01D 18/00; G01F 23/00

[52] U.S. Cl. ................................ 346/140 R; 116/227

[58] Field of Search .................... 346/140 IJ, 140 PD, 346/140 R; 116/227

[56] References Cited

U.S. PATENT DOCUMENTS

| | | | |
|---|---|---|---|
| 4,604,633 | 8/1986 | Kimura et al. | 346/140 PD |
| 4,639,251 | 1/1987 | Kirkland | 116/227 X |

*Primary Examiner*—George H. Miller, Jr.
*Attorney, Agent, or Firm*—Roland I. Griffin; Edward Maker, II

[57] ABSTRACT

An ink device (1) having means for determining the amount of ink remaining in an ink bag comprises a rigid, rectangular box (3) which has a window (29) in the top (13), a collapsible ink bag (23) in the container, one side of the ink bag being secured (33) to the corresponding side (9) of the container and the opposite side of the ink bag having a rigid plate or strip (19) secured to its lower half so that the top edge (21) of the plate is visible through the window. The container and the ink bag have cooperating means (17, 29) to allow ink (35) to flow into or out of the ink bag.

8 Claims, 1 Drawing Sheet

LEVEL SENSOR FOR INK BAG

TECHNICAL FIELD

This invention relates to ink-jet printers and to ink cartridges used therein. More particularly, this invention relates to a method and means by which an operator or a sensor is able to detect a low ink supply in an ink bag, thus making it possible to cut off the supply of ink from the ink bag to the ink bladder just before the ink bag runs dry. In this way, it is possible to prevent any air, which is present in the ink bag, from entering the ink bladder.

BACKGROUND ART

Various means are known in the art for storing a significant quantity of ink in an ink bag or other container in an ink-jet printer and supplying it in smaller quantities to an ink bladder. For instance, an ink delivery system has been developed which is provided with a reservoir for supplying a refillable bladder. The bladder is then used to feed the printhead, and when the bladder is depleted, it is refilled from the reservoir or ink bag. The system utilizes a three-way valve which permits selective fluid communication between the ink bag and the bladder (refill mode) and between the bladder and the ink-jet printhead (print mode). A third position (shipping mode) prevents fluid communication between any of the compartments. U.S. Pat. No. 4,714,937 describes and claims this system.

In the embodiment illustrated in the patent, the ink bag and the ink bladder are shown mounted side by side on a support platform; the three-way valve and fluid communicating channels are located under the top surface of the platform. The ink flows out of the bottom of the ink bag and into a short vertical channel; then it flows horizontally to the three-way valve; next, with the valve in the refill mode, it flows through the valve into a vertical channel and up into the ink bladder. When the valve is turned to the print mode, the ink flows out of the bottom of the bladder through the vertical channel to the three-way valve, then through the valve into another channel to the printhead.

In another arrangement, not illustrated in the patent but illustrated in copending application Ser. No. 07/390,807, filed Aug. 8, 1989, which has the same assignee as this application, the ink bag is mounted on the platform and the ink bladder is suspended from the platform and is at a level below the ink bag. With the valve in the refill mode, ink flows out of the bottom of the ink bag into a vertical channel, then into the three-way valve where it is diverted into a horizontal channel to the ink bladder. When the three-way valve is turned to the print mode, ink returns through a horizontal channel (the vertical channel in the refill mode) to the three-way valve, where it is now diverted into another channel to the printhead.

A problem associated with both of these systems occurs when the ink supply is depleted. This allows the air, which tends to accumulate in the ink bag, to enter the bladder, from which the air needs to be removed. This task increases the complexity and cost of the product. When this happens, the bladder will refill with air rather than ink. This results in a printing failure.

DISCLOSURE OF THE INVENTION

This invention is an efficient, low cost method for determining the volume of ink remaining in a collapsible bag that is enclosed in a rigid rectangular container. A rigid plate or strip, which has substantially the same height as the bag, is attached to the lower half of one side of the bag. The opposite side of the bag is attached along substantially its entire width and height to the corresponding side of the container. On the top surface of the container is a window or opening through which the observer can see the top edge of the attached plate.

The ink bag may be made from a sheet of collapsible material, such as aluminum foil, natural or synthetic rubber, low density polyethylene, nylon, vinyl acetate, etc. The sheet may be folded on itself in such a way as to form a pocket. Edges of the foil are secured together to form seams along each vertical side and across the top. These seams plus the attachments to the rigid plate and one side of the rigid container provide support for the bag. Ink flows out of the bag and creates a vacuum. The bag tends to collapse toward the side to which it is attached rather than from the top. At the same time, the collapsing bag pulls the rigid plate or strip along with it.

A scale may be attached to the top of the box and adjacent to or in a window, allowing an observer to read the volume of ink remaining. When the ink supply is almost depleted, the flow from the ink bag to the ink bladder can be interrupted, for example by turning the three-way valve to the off or shipping mode.

BRIEF DESCRIPTION OF THE DRAWINGS

Referring now to the drawings.

BEST MODES FOR CARRYING OUT THE INVENTION

The invention will now be described with reference to the drawings, wherein the same elements have the same numbers throughout.

Figure 1:
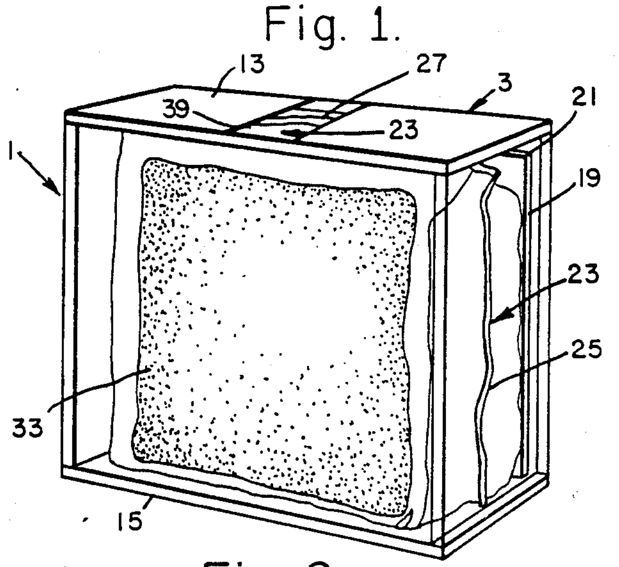
FIG. 1 is a perspective view, partially in cross-section, of one embodiment of the invention; the rigid container is transparent in order to better illustrate the invention.
Figure 3:
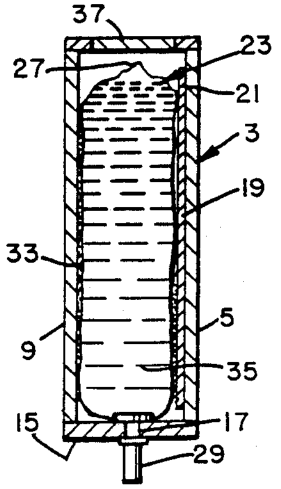
FIGS. 3, 4, and 5 are cross-sectional views of FIG. 2, illustrating the ink bag with decreasing levels of ink as well as the ink outlet means.
Figure 4:
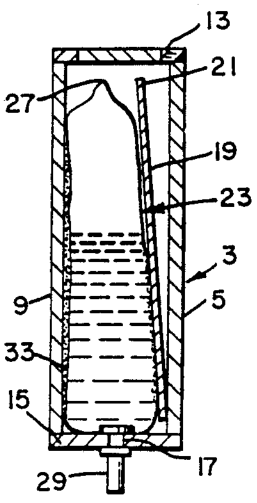
Figure 5:
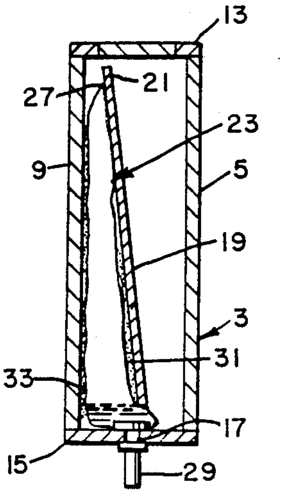

As shown in FIG. 1, an ink device for use with an inkjet printer is shown generally at 1. The exterior of the device is a rigid rectangular container 3, which has sides 5, 7, 9, and 11, top 13, and bottom 15. Bottom 15 has hole 17, which is not shown in FIG. 1 but is shown in FIGS. 3, 4, and 5.

Rigid plate 19 is located inside container 3, parallel to side 5. Top 21 of plate 19 is located under top 13 of container 3 so that it is visible in whole or on part to an observer. The lower half of plate 19 is affixed to collapsible ink bag 23; adhesive may be used for this purpose. Rigid plate 19 may be made from engineering plastic, such as polycarbonate that is about 20 to 30 mils thick. Plate 19 may be substantially the width of ink bag 23, but it may also be a vertical strip. In either case, whether a plate or a strip, it should be substantially the height of the bag so that the bottom portion may be secured to ink bag 23 and top edge 21 will be visible through the top of container 3.

Ink bag 23 is made of collapsible material. However, side seams 25 and top seam 27 provide some support. The seams and the fact that a side of bag 23 is secured by adhesive or otherwise affixed to side 9 of container 3, cause bag 23 to collapse toward side 9 rather than toward bottom 15 as ink is withdrawn.

Figure 2:
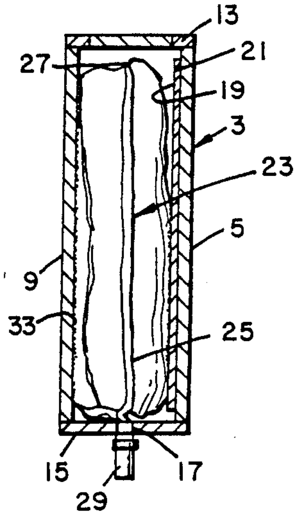
FIG. 2 is a side view of the container of FIG. 1.

FIG. 2 illustrate bag 23 almost full. Ink outlet 29 protrudes from bottom 15 and communicates with an ink bladder (not shown) through a three way valve (not shown). Plate 19 is between ink bag 23 and side 5 of container 3. It is affixed to bag 23 at its lower portion through adhesive layer 31. The opposite side of bag 23 is affixed to side 9 of container 3 through adhesive layer 33. As shown in FIG. 1, layer 33 is substantially co-extensive with that side of bag 23.

FIGS. 3, 4, and 5 show, in cross-section, ink bag 23 and plate 19 with three different levels of ink 35. Plate 19 is all the way to the right side of container 3 in FIG. 3 where ink bag 23 is full.

In FIG. 4, top 21 of plate 19 is substantially halfway across the width of container 3 when the level of ink 35 has fallen to the half-way mark.

In FIG. 5, top 21 is almost all the way across the width of container 3 when the supply of ink 35 is about exhausted.

FIGS. 3, 4, and 5 also illustrate ink outlet 29 located in hole 17 in bottom 15.

Figure 6:
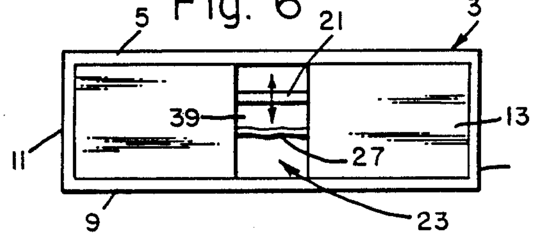
FIG. 6 is a top plan view of a similar container but with an opaque top and transparent window.

FIG. 6 is a top plan view of container 3 showing a transparent area or window 39 in top 13. Top 21 of plate 19 is approximately one-third the way from side 5. A scale may be associated with window 39 so that an observer may read the volume of ink remaining. A scale is not essential to the basic invention because it is readily apparent that an observer can make a reasonable approximation of the position of top 21 in window 39.

INDUSTRIAL APPLICATION

The ink device of this invention can be used with ink-jet printers, especially thermal ink-jet printers.

Thus, there has been disclosed a level sensor for an ink bag used in ink-jet printing. It will be readily apparent to those skilled in the art that various changes and modifications of an obvious nature may be made without departing from the spirit of the invention, and all such changes and modifications are deemed to fall within the scope of the invention, as defined by the appended claims.

I claim:

1. An ink device for use with an ink-jet printer comprising
   (a) a rigid rectangular container, having a top, four sides, and a bottom, said top having a transparent area therein and said bottom having an opening therein;
   (b) a contractible ink bag substantially filling said container when full, said bag having an ink outlet means cooperatively arranged with said opening in said bottom of said container;
   (c) a rigid plate or strip adjacent to a first side of said bag and secured to said first side at its lower half, said plate or strip being substantially equal in height to said first side so that a top edge of said plate or strip is visible through said transparent area in said top of said container; and
   (d) means securing a second side of said bag, said second side being opposite to said first side of said bag, to the side of the container adjacent to said second side of said bag.

2. An ink device of claim 1 wherein said ink bag is made of collapsible material.

3. An ink device of claim 1 wherein said container has two long sides and two short sides and said ink bag is secured to one of said long sides.

4. An ink device of claim 3 wherein said transparent area in said top is a window which is approximately at right angle to said two long sides and has a length substantially equal to the distance between said rigid plate and said second side of said bag when said bag is inflated.

5. An ink device of claim 4 having visual means associated with said opening for determining location of said rigid plate relative to the distance between said rigid plate and said second side of said bag when said bag is inflated.

6. An ink device of claim 5 wherein said visual means is a scale.

7. An ink device of claim 6 wherein said scale is located within said window.

8. An ink device of claim 6 wherein said scale is located along side said window.

* * * * *